United States Patent
Steck et al.

(10) Patent No.: US 11,046,357 B2
(45) Date of Patent: Jun. 29, 2021

(54) METHOD FOR THE SIMPLIFIED ASSEMBLY OF A RACK-AND-PINION STEERING BOX OF A RACK-AND-PINION STEERING SYSTEM

(71) Applicants: THYSSENKRUPP PRESTA AG, Eschen (LI); thyssenkrupp AG, Essen (DE)

(72) Inventors: Philippe Steck, Gamprin-Bendern (LI); Patrick Baumgartner, St. Gallen (CH)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 243 days.

(21) Appl. No.: 16/344,597

(22) PCT Filed: Nov. 8, 2017

(86) PCT No.: PCT/EP2017/078536
§ 371 (c)(1),
(2) Date: Apr. 24, 2019

(87) PCT Pub. No.: WO2018/087112
PCT Pub. Date: May 17, 2018

(65) Prior Publication Data
US 2020/0055539 A1    Feb. 20, 2020

(30) Foreign Application Priority Data
Nov. 9, 2016   (DE) ................. 10 2016 013 272.8

(51) Int. Cl.
*B62D 5/04*    (2006.01)
*B62D 3/12*    (2006.01)

(52) U.S. Cl.
CPC ......... *B62D 5/0454* (2013.01); *B62D 5/0403* (2013.01); *B62D 5/0421* (2013.01); *B62D 3/12* (2013.01)

(58) Field of Classification Search
None
See application file for complete search history.

(56) References Cited

U.S. PATENT DOCUMENTS 10,167,009 B2 *  1/2019  Yano ................. B62D 5/04
2012/0233860 A1  9/2012  Yoneda
(Continued)

FOREIGN PATENT DOCUMENTS

CN    103318249 A    9/2013
DE    23 365 72 A    1/1974
(Continued)

OTHER PUBLICATIONS

English Translation of International Search Report issued in PCT/EP2017/078536, dated Feb. 9, 2018.

*Primary Examiner* — Kevin Hurley
(74) *Attorney, Agent, or Firm* — thyssenkrupp North America, LLC

(57) ABSTRACT

A method for assembling a rack-and-pinion steering gear may involve introducing a steering pinion into a housing opening of a steering gear housing such that a region of a narrowed portion of a pinion shaft is situated at a level of a rack to be inserted, introducing the rack into the housing opening of the steering gear housing such that the rack is pushed past the narrowed portion of the pinion shaft into a setpoint position, and moving the pinion shaft farther into the steering gear housing to an end position such that a toothing region of the rack enters into engagement with a toothing of the steering pinion.

13 Claims, 3 Drawing Sheets

(56) References Cited

U.S. PATENT DOCUMENTS

| | | |
|---|---|---|
| 2013/0180794 A1 | 7/2013 | Shiino |
| 2013/0248278 A1 | 9/2013 | Ishii |
| 2015/0266506 A1 | 9/2015 | Sato |
| 2016/0016607 A1* | 1/2016 | Yoshida .................. B62D 5/04 180/446 |
| 2016/0137219 A1 | 5/2016 | Schröder |
| 2016/0207565 A1 | 7/2016 | Maier |

FOREIGN PATENT DOCUMENTS

| | | |
|---|---|---|
| DE | 10 2011 001 217 A | 9/2012 |
| DE | 102015213304 A | 11/2016 |
| EP | 2 703 252 A | 3/2014 |
| JP | 2009-120094 A | 6/2009 |
| JP | 2014-169079 A | 9/2014 |
| JP | 2015-178295 A | 10/2015 |

* cited by examiner

METHOD FOR THE SIMPLIFIED ASSEMBLY OF A RACK-AND-PINION STEERING BOX OF A RACK-AND-PINION STEERING SYSTEM

CROSS REFERENCE TO RELATED APPLICATIONS

This application is a U.S. National Stage Entry of International Patent Application Serial Number PCT/EP2017/078536, filed Nov. 8, 2017, which claims priority to German Patent Application No. DE 10 2016 013 272.8, filed Nov. 9, 2016, the entire contents of both of which are incorporated herein by reference.

FIELD

The present disclosure generally relates to steering systems, including methods for assembling a rack-and-pinion steering gear of a rack-and-pinion steering system.

BACKGROUND

Generic rack-and-pinion steering systems comprise a rack, which is guided in linearly movable fashion in a steering gear housing, and a rotatably mounted steering pinion, which is in engagement with the rack. The steering torque applied to a steering wheel by a driver is transmitted via a steering shaft to an input shaft of the steering gear. The input shaft of the steering gear is connected to a steering pinion, which meshes with the rack. A rotation of the input shaft and of the steering pinion is converted by means of the toothed engagement of the rack into a linear movement of the rack. Articulatedly connected to the rack are track rods, by means of which the steered wheels are adjusted by a steer angle. The rotation of the steering wheel is thus converted into a steering movement of the steered wheels. In the case of electrically assisted rack-and-pinion steering systems, a servo motor is provided which acts, for example via a mechanical reduction gear with worm and worm wheel, on the steering pinion and thus assists the driver in a steering maneuver. Here, the servo motor is arranged between the input shaft and the steering pinion. This arrangement can however prove to be disadvantageous, because the steering pinion and rack can be placed in operative connection only with difficulty.

Thus a need exists for a simplified method for assembling a rack-and-pinion steering gear of a rack-and-pinion steering system for a motor vehicle.

DETAILED DESCRIPTION

Figure 1:
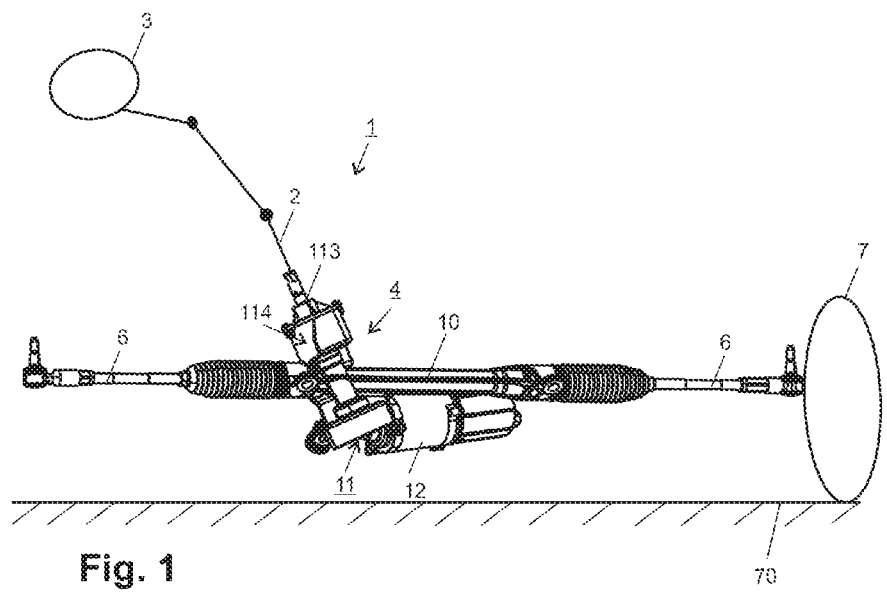
FIG. 1 is a schematic side view of an example rack-and-pinion steering system.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

Accordingly, a method for assembling a rack-and-pinion steering gear of a rack-and-pinion steering system is provided, wherein the rack-and-pinion steering system comprises a pinion shaft connected to a steering shaft, which pinion shaft comprises a steering pinion which is in engagement with a rack for pivoting steerable wheels, and wherein the rack-and-pinion steering system comprises an electric motor which drives the pinion shaft via a reduction gear, characterized in that the steering shaft, the pinion shaft with the steering pinion and the reduction gear form a collective arrangement which is accommodated in a steering gear housing, wherein the pinion shaft comprises, between the steering pinion and an end remote from the steering shaft, a narrowed portion whose diameter is smaller than that of the steering pinion, wherein the following method steps are provided:

a) introducing the steering pinion into a housing opening, provided for the same, of the steering gear housing, specifically such that the region of the narrowed portion of the pinion shaft is situated at the level of the rack to be inserted b) introducing the rack into the housing opening, provided for the same, of the steering gear housing, wherein the rack is pushed past the narrowed portion of the pinion shaft into a setpoint position c) moving the pinion shaft further into the steering gear housing as far as an end position, such that a toothing region of the rack enters into engagement with the toothing of the steering pinion.

The steering gear is thus particularly easy to assemble because the pinion and the rack can be introduced in succession into the housing. This method furthermore has the advantage that the steering gear housing can be formed as a single piece.

It is preferable if the diameter of the narrowed portion is smaller than that of the steering pinion and of the rest of the pinion shaft; it can thus be ensured that the steering rack can be pushed past the pinion shaft.

It is furthermore advantageous if the narrowed portion directly adjoins the steering pinion on the pinion shaft. The pinion shaft can thus be introduced into the housing already to a very great extent in step a), and only has to be moved slightly in step c) in order to produce the engagement.

The pinion shaft is preferably mounted rotatably in the steering gear housing in a bearing, wherein the narrowed portion is arranged between the steering pinion and the bearing.

In a preferred embodiment, provision is made whereby, after step c), the reduction gear is introduced, at that end of the pinion shaft which is remote from the steering shaft, into the steering gear housing. The assembly of the reduction gear is thus likewise particularly straightforward.

Also provided is a rack-and-pinion steering system for a motor vehicle, comprising a pinion shaft connected to a steering shaft, which pinion shaft comprises a steering pinion which is in engagement with a rack, which rack is mounted in a housing so as to be displaceable along a longitudinal axis, in order to pivot steerable wheels, wherein the steering shaft, the pinion shaft with the steering pinion and the reduction gear form a collective arrangement which is accommodated in a steering gear housing, and having an electric motor which drives the pinion shaft via a reduction gear, wherein the pinion shaft comprises, between the steering pinion and an end remote from the steering shaft, a narrowed portion whose diameter is smaller than that of the steering pinion, such that, during the assembly of the rack-and-pinion steering gear, the rack can be pushed into the steering gear housing past the narrowed portion of the pinion shaft into an end position. As already presented above, this yields the advantage that the assembly of the steering gear is particularly straightforward.

Preferably, the pinion shaft is, between the steering pinion and the reduction gear, mounted rotatably in the steering gear housing in a bearing. It is furthermore preferable if the pinion shaft comprises, between the steering pinion and the bearing, the narrowed portion, whose diameter is smaller than that of the steering pinion and of a bearing seat of the bearing; it is thus ensured that the rack can be pushed past the pinion shaft into the housing. The narrowed portion preferably directly adjoins the steering pinion on the pinion shaft. In a preferred embodiment of the invention, the diameter of the narrowed portion is smaller than the diameter of the steering pinion and of the rest of the pinion shaft.

In a preferred embodiment, the electric motor and the reduction gear are arranged on the underside of the steering gear at the end remote from the steering shaft. Here, the drive requires particularly little structural space.

It is furthermore advantageous if the pinion shaft is, at its end close to the steering shaft, connected to a torsion bar which connects the pinion shaft to an input shaft, wherein the torsion bar is part of a torque sensor which determines the steering moment that has to be applied to a steering wheel in order to activate the electric motor, wherein the reduction gear and the electric motor are arranged on the opposite side of the rack in relation to the torque sensor. The reduction gear and the electric motor are thus provided on that side of the pinion shaft which is remote from the steering shaft, and are thus situated, below the rack, relatively close to the roadway, which is particularly space-saving.

In a preferred embodiment, the reduction gear is a worm gear, wherein a worm wheel of the worm gear concentrically surrounds, and is connected rotationally conjointly to, the pinion shaft.

The steering gear housing is preferably formed as a single piece with the drive gear housing in which the reduction gear is accommodated. By means of a single-piece housing, it is possible for problematic seals to be omitted, and for weight to be saved.

FIG. 1 schematically shows a rack-and-pinion steering system 1 of a motor vehicle. A steering shaft 2 serves for transmitting the steering movements performed by a driver of the motor vehicle at a steering wheel 3 to a rack-and-pinion steering gear 4. The rack-and-pinion steering gear 4 converts a rotational movement of the steering shaft 2 into a movement of a rack 5, whereby the wheel 7, which is articulated on a track rod 6, of the vehicle performs a steering movement. The rotational movement of the steering shaft 2 is converted by means of a steering pinion 8, which meshes with the rack 5 in a toothing region 9, into a translational movement of the rack 5. The rack 5 is mounted in axially movable fashion in a steering gear housing 10. On that side of the rack 5 which is remote from the steering shaft, there are arranged a reduction gear 11 and an electric servo motor 12. The servo motor 12 acts via the reduction gear 11 on the steering pinion 8 for the purposes of steering assistance.

Figure 2:
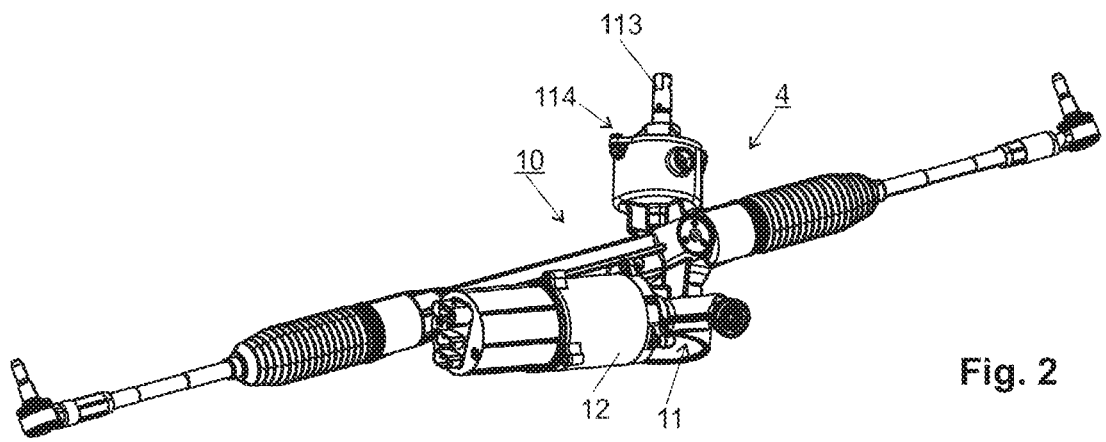
FIG. 2 is a perspective view of the steering gear from FIG. 1.

FIG. 2 illustrates, in a second view, the position of the reduction gear 11 and of the servo motor 12 below the rack 5, that is to say so as to be situated relatively close to the roadway 70.

Figure 3:
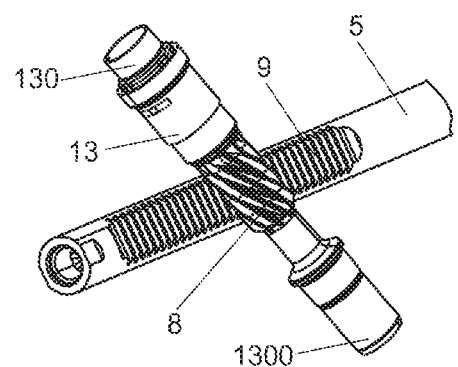
FIG. 3 is a detail view illustrating engagement of an example rack with an example steering pinion.
Figure 4:
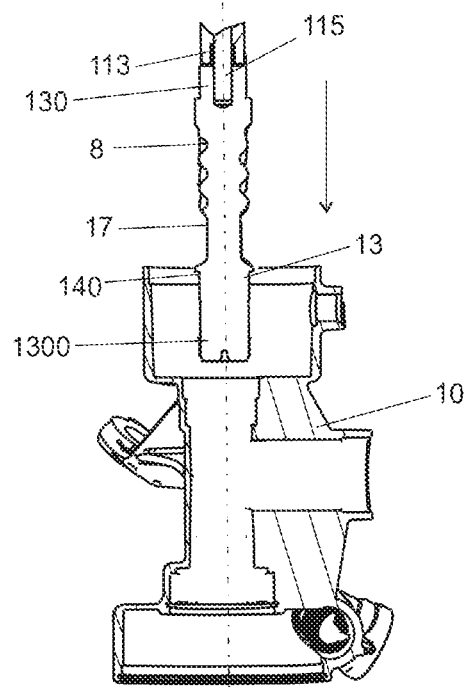
FIG. 4 is a longitudinal sectional view of an example rack-and-pinion steering system in a first step of an example method of assembly.
Figure 5:
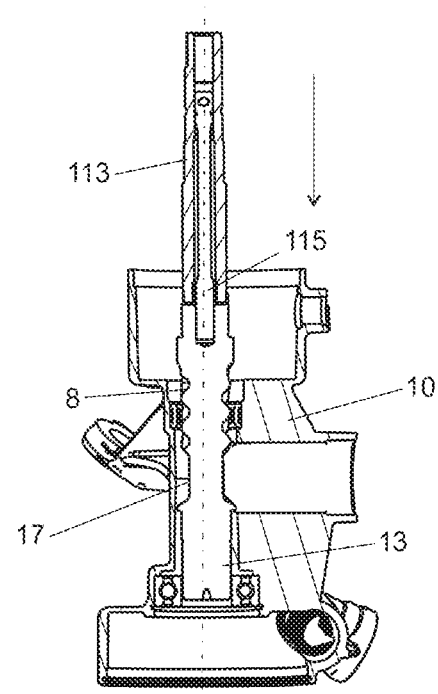
FIG. 5 is a longitudinal sectional view of an example rack-and-pinion steering system in a second step of an example method of assembly.
Figure 6:
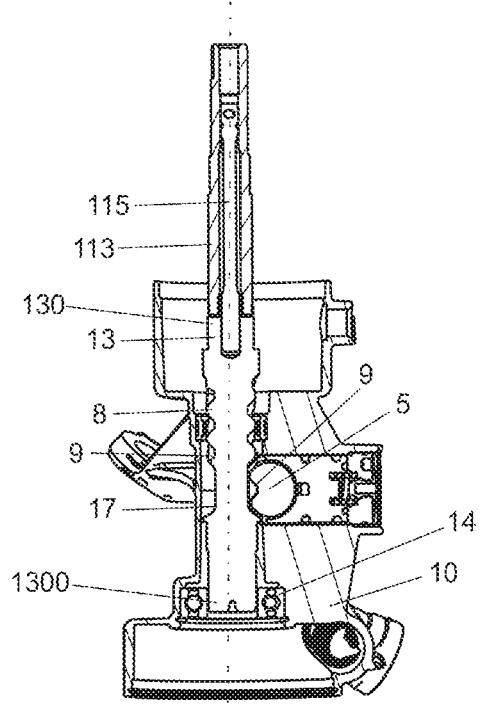
FIG. 6 is a longitudinal sectional view of an example rack-and-pinion steering system in a third step of an example method of assembly.

FIG. 3 shows the engagement of the steering pinion 8 into the toothing region 9 of the rack 5. The steering pinion 8 is arranged on a pinion shaft 13, which comprises an end 130 close to the steering shaft and an end 1300 remote from the steering shaft.

Figure 7:
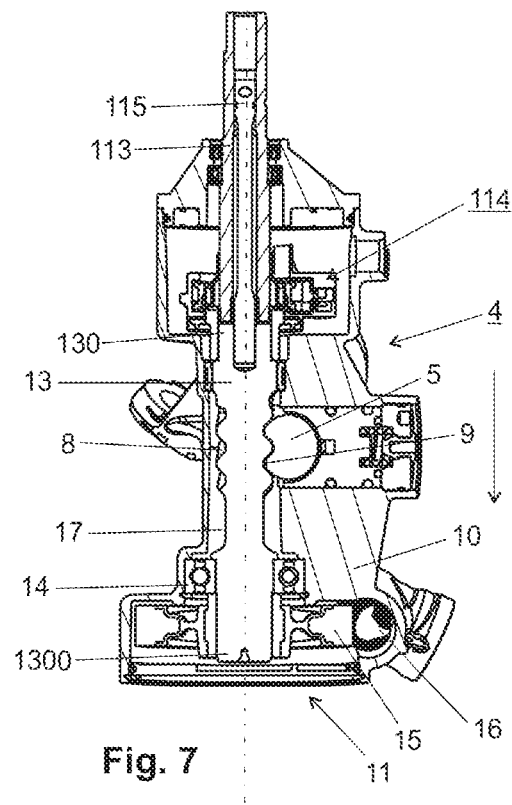
FIG. 7 is a longitudinal sectional view of an example rack-and-pinion steering system in a fourth step of an example method of assembly.

As shown in FIG. 7, in an assembled state of the rack-and-pinion steering gear 4, the end 130 close to the steering shaft is connected to a torsion bar 115, which connects the pinion shaft 13 to an input shaft 113, which is in turn connected rotationally conjointly to the steering wheel 3 via the steering shaft 2. In a manner dependent on a steering wheel torque, the torsion bar 115 gives rise to a relative rotation between the input shaft 113 and the pinion shaft 13. The torsion bar 115 is part of a torque sensor 114, which determines the steering moment that has to be applied to the steering wheel 3 in order to activate the electric motor 12. The pinion shaft 13 is, between the steering pinion 8 and the end 1300 remote from the steering shaft, mounted rotatably in the steering gear housing 10 in a bearing 14. At that end 1300 of the pinion shaft 13 which is remote from the steering shaft, there is provided a worm wheel 15 of the reduction gear 11, which worm wheel concentrically surrounds, and is connected rotationally conjointly to, the pinion shaft 13. The electric servo motor (not illustrated here) drives a worm shaft 16, which meshes with the worm wheel 15 arranged on the pinion shaft 13. Since the worm gear 11 is arranged at that end 1300 of the pinion shaft 13 which is remote from the steering shaft, and said worm gear is thus arranged so as to lie below the engagement between the rack 5 and the pinion 8, the servo motor can likewise be attached to the underside of the steering gear 4, which is particularly space-saving. The underside is to be understood here to mean that side of the steering gear 4 which points in the direction of the roadway 70.

Between steering pinion 8 and bearing 14, the pinion shaft 13 comprises a narrowed portion 17, whose diameter is smaller than that of the steering pinion 8 and of a bearing seat 140 of the bearing 14. The diameter of the narrowed portion 17 is furthermore smaller than the rest of the pinion shaft 13. The narrowed portion 17 preferably directly adjoins the steering pinion 8.

FIGS. 4 to 7 show the assembly of the rack-and-pinion steering gear 4 in multiple steps. In a first step, the input shaft 113 with torsion bar 115 and steering pinion 13 is pushed into a housing opening, provided for the same, of the steering gear housing 10, specifically to such an extent that the region of the narrowed portion 17 of the pinion shaft 13 is situated at the level of the rack 5 to be inserted, and that end 1300 of the pinion shaft 13 which is remote from the steering shaft is surrounded by the bearing 14. In a second step, the rack 5 is pushed into the housing opening correspondingly provided for the same. The rack 5 can be pushed past the narrowed portion 17 of the pinion shaft 13 into a setpoint position. The pinion shaft 13 is subsequently pushed downward, further into the steering gear housing 10, as far as an end position, such that the toothing region 9 of the rack 5 enters into engagement with the toothing of the steering pinion 8. The bearing 14 is thus situated on the bearing seat 140 of the pinion shaft 13 and the worm wheel 15 can be fastened to that end 1300 of the pinion shaft 13 which is remote from the steering shaft. The rack-and-pinion mechanism can thus be assembled particularly easily in the steering gear housing 10. After the steering gear has been assembled, the worm 16 is introduced into an opening, provided for the same, of the drive gear housing. Subsequently, the bearing 14 is arranged on the bearing seat 140 of the pinion shaft 13, and the worm wheel 15 is fastened rotationally conjointly on the pinion shaft 13. The torque sensor 114 is subsequently inserted from above into the steering gear housing 10.

The steering gear housing 10 is preferably formed as a single piece with the drive housing in which the reduction gear is accommodated, and produced from aluminum or magnesium. The design as a single piece has the advantage that the sealing point of drive gear housing with respect to steering gear housing is eliminated. Furthermore, a single-piece housing can be produced particular cost-efficiently and yields a considerable weight saving.

Provision may also be made for the reduction gear to be arranged above the rack or on that side of the pinion 8 which is close to the steering shaft, such as is provided conventionally, wherein the servo motor is conventionally arranged between the input shaft and the steering pinion.

Figure 8:
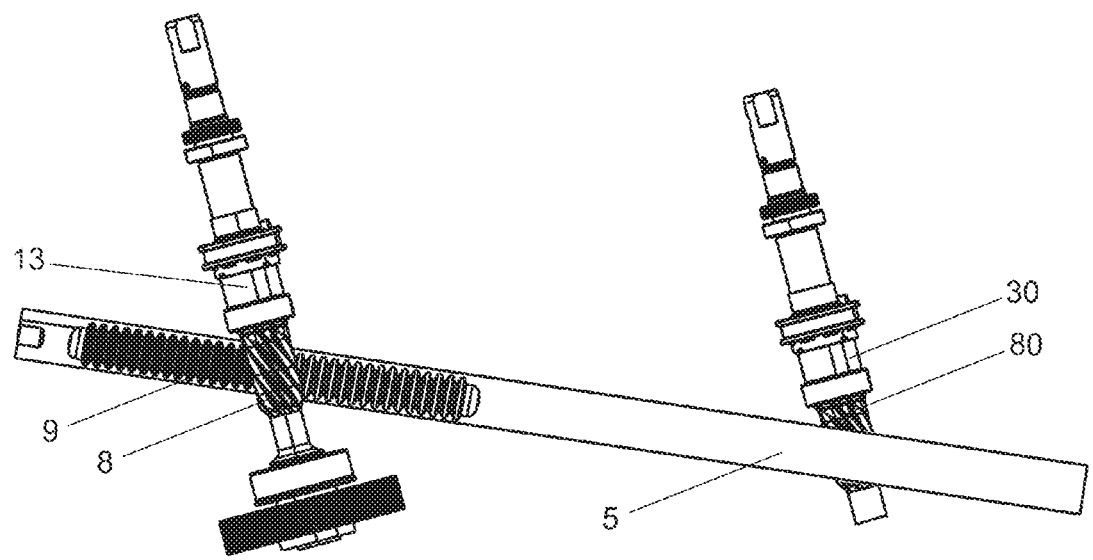
FIG. 8 is a perspective view of an example rack-and-dual-pinion steering system.

As illustrated in FIG. 8, provision may also be made whereby, in the gear housing 10, the rack 5 meshes with a second pinion 80 of a second pinion shaft 30.

What is claimed is:

1. A method for assembling a rack-and-pinion steering gear of a rack-and-pinion steering system that comprises a pinion shaft connected to a steering shaft, wherein the pinion shaft includes a steering pinion engaged with a rack for pivoting steerable wheels; and an electric motor that drives the pinion shaft via a reduction gear, wherein the steering shaft, the pinion shaft with the steering pinion, and the reduction gear are received in a steering gear housing, wherein between the steering pinion and an end of the pinion shaft distal the steering shaft the pinion shaft comprises a narrowed portion having a diameter that is smaller than a diameter of the steering pinion, the method comprising:
introducing the steering pinion into a housing opening of the steering gear housing such that a region of the narrowed portion of the pinion shaft is positioned at a level of the rack to be inserted;
introducing the rack into the housing opening of the steering gear housing, wherein the rack is pushed past the narrowed portion of the pinion shaft into a setpoint position; and
moving the pinion shaft farther into the steering gear housing to an end position such that a toothing region of the rack engages with a toothing of the steering pinion.

2. The method of claim 1 wherein the diameter of the narrowed portion of the pinion shaft is smaller than a diameter of a remainder of the pinion shaft.

3. The method of claim 1 wherein after moving the pinion shaft farther into the steering gear housing, the method comprises introducing the reduction gear into the steering gear housing at the end of the pinion shaft that is distal the steering shaft.

4. A rack-and-pinion steering system for a motor vehicle comprising:
a pinion shaft connected to a steering shaft, the pinion shaft comprising a steering pinion engaged with a rack that is mounted in a steering gear housing so as to be displaceable along a longitudinal axis to pivot steerable wheels, wherein between the steering pinion and an end of the of the pinion shaft distal the steering shaft the pinion shaft comprises a narrowed portion with a diameter that is smaller than a diameter of the steering pinion such that the rack is configured to be pushed into the steering gear housing past the narrowed portion of the pinion shaft into an end position during assembly; and
an electric motor that drives the pinion shaft via a reduction gear, wherein the steering shaft, the pinion shaft with the steering pinion, and the reduction gear are received in the steering gear housing
wherein the pinion shaft is, between the steering pinion and the reduction gear, mounted rotatably in the steering gear housing in a bearing,
wherein the narrowed portion of the pinion shaft is disposed longitudinally between the steering pinion and the bearing.

5. The rack-and-pinion steering system of claim 4 wherein the diameter of the narrowed portion is smaller than a smallest diameter of a longitudinal extent of the pinion shaft that is disposed within the bearing.

6. The rack-and-pinion steering system of claim 4 wherein the narrowed portion directly adjoins the steering pinion on the pinion shaft.

7. The rack-and-pinion steering system of claim 4 wherein the diameter of the narrowed portion is smaller than a diameter of a remainder of the pinion shaft.

8. The rack-and-pinion steering system of claim 4 wherein the electric motor and the reduction gear are disposed on an underside of a steering gear at the end of the of the pinion shaft distal the steering shaft.

9. The rack-and-pinion steering system of claim 4 wherein the end of the of the pinion shaft distal the steering shaft is a first end, wherein a second end of the pinion shaft proximate the steering shaft is connected to a torsion bar that connects the pinion shaft to an input shaft, wherein the torsion bar is part of a torque sensor that determines a steering moment to be applied to a steering wheel to activate the electric motor, wherein the reduction gear and the electric motor are disposed on an opposite side of the rack relative to the torque sensor.

10. The rack-and-pinion steering system of claim 4 wherein the reduction gear is a worm gear, wherein a worm wheel of the worm gear concentrically surrounds the pinion shaft and is connected rotationally conjointly to the pinion shaft.

11. The rack-and-pinion steering system of claim 4 wherein the steering gear housing is configured as a single piece with the steering gear housing in which the reduction gear is received.

12. A method for assembling a rack-and-pinion steering gear of a rack-and-pinion steering system, the method comprising:
- introducing a steering pinion into a housing opening of a steering gear housing such that a region of a narrowed portion of the pinion shaft is positioned at a level of a rack to be inserted, wherein a diameter of the narrowed portion is smaller than a diameter of a remainder of the pinion shaft;
- introducing the rack into the housing opening of the steering gear housing, wherein the rack is pushed past the narrowed portion of the pinion shaft into a setpoint position; and
- moving the pinion shaft farther into the steering gear housing to an end position such that a toothing region of the rack engages with a toothing of the steering pinion.

13. The method of claim 12 wherein after moving the pinion shaft farther into the steering gear housing, the method comprises introducing a reduction gear into the steering gear housing at an end of the pinion shaft that is distal the steering shaft.

* * * * *